US009459732B2

(12) United States Patent
Thuillier et al.

(10) Patent No.: US 9,459,732 B2
(45) Date of Patent: Oct. 4, 2016

(54) METHOD FOR DETERMINING THE LOCATIONS OF ONE OR MORE IMPACTS OR TOUCHES ON A SURFACE OF AN OBJECT INCLUDING TWO OR MORE TRANSDUCERS (75) Inventors: Bruno Thuillier, San Francisco, CA (US); Damien Berget, Belmont, CA (US)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 113 days.

(21) Appl. No.: 13/379,321

(22) PCT Filed: May 26, 2010

(86) PCT No.: PCT/EP2010/003195
§ 371 (c)(1),
(2), (4) Date: Jan. 23, 2012

(87) PCT Pub. No.: WO2010/145749
PCT Pub. Date: Dec. 23, 2010

(65) Prior Publication Data
US 2012/0120031 A1    May 17, 2012

(30) Foreign Application Priority Data

Jun. 19, 2009 (EP) .................................... 09290469

(51) Int. Cl.
G06F 3/043 (2006.01)
G10L 21/02 (2013.01)

(52) U.S. Cl.
CPC ............. *G06F 3/043* (2013.01); *G06F 3/0436* (2013.01); *G10L 21/0202* (2013.01)

(58) Field of Classification Search
CPC .... G06F 3/043; G06F 3/0433; G06F 3/0436; G10L 21/0202
See application file for complete search history.

(56) References Cited

U.S. PATENT DOCUMENTS 7,315,300 B2    1/2008 Hill et al.
2002/0126103 A1*  9/2002 Knowles ................ H03K 17/96
                                                345/177

(Continued)

FOREIGN PATENT DOCUMENTS

CN    1669048 A     9/2005
CN    101095097 A   12/2007

(Continued)

OTHER PUBLICATIONS

PCT International Search Report for PCT/EP2010/003195.

(Continued)

*Primary Examiner* — Michael Faragalla
*Assistant Examiner* — Sujit Shah
(74) *Attorney, Agent, or Firm* — Sterne, Kessler, Goldstein & Fox P.L.L.C.

(57) ABSTRACT

The invention relates to a method for determining the locations of one or more impacts or touches on a surface of an object including two or more transducers which improves the precision of localisation even for low signal to noise ratios and furthermore provides the possibility to identify multi touch or multi impact situations. To achieve these objects the method comprises the steps of: a) receiving a signal, in particular an acoustic signal, from each one of the transducers, wherein the signals correspond to at least one impact at least one location on the surface; b) determining a representative value based on the signals received in step a) and predetermined properties, in particular acoustic properties, of the object at a given location on the surface of the object; and c) deciding whether the at least one impact at the at least one location on the surface of step a) corresponds to the given location on the surface based on a comparison of the representative value and the corresponding value of the at least two signals.

20 Claims, 5 Drawing Sheets

(56) References Cited

U.S. PATENT DOCUMENTS

| | | | | |
|---|---|---|---|---|
| 2003/0217873 | A1* | 11/2003 | Paradiso et al. | 178/18.04 |
| 2004/0246239 | A1* | 12/2004 | Knowles | G06F 3/0436 345/177 |
| 2004/0264561 | A1* | 12/2004 | Alexander | H04L 25/0204 375/232 |
| 2005/0146512 | A1* | 7/2005 | Hill | G06F 3/0436 345/173 |
| 2005/0174338 | A1* | 8/2005 | Ing et al. | 345/177 |
| 2005/0212777 | A1* | 9/2005 | Ing | G06F 3/0433 345/173 |
| 2009/0009488 | A1 | 1/2009 | D'Souza et al. | |
| 2009/0116339 | A1* | 5/2009 | Ing | G06F 3/0436 367/129 |
| 2009/0122028 | A1* | 5/2009 | Ing | 345/177 |
| 2009/0195517 | A1* | 8/2009 | Duheille | G06F 3/043 345/177 |
| 2010/0302184 | A1* | 12/2010 | East et al. | 345/173 |
| 2011/0137968 | A1* | 6/2011 | Ing | G06F 3/043 708/201 |

FOREIGN PATENT DOCUMENTS

| | | |
|---|---|---|
| EP | 1512 116 A2 | 3/2005 |
| JP | 2005529350 A | 9/2005 |
| JP | 2007517310 A | 6/2007 |
| JP | 2008525808 A | 7/2008 |
| JP | 2009015854 A | 1/2009 |
| JP | 2009181570 A | 8/2009 |
| KR | 10-2007-0099624 A | 10/2007 |
| WO | WO 2006/069596 A1 | 7/2006 |

OTHER PUBLICATIONS

Office Action for Korean Application No. 10-2012-7001463; dated Aug. 20, 2013.

Office Action for Japanese Application No. 2012-515372; dated Jul. 30, 2013.

Extended European Search Report for EP Patent Application No. 09 29 0469, The Hague, Netherlands, mailed on Dec. 2, 2009.

Office Action mailed Dec. 29, 2014, in Chinese Patent Application No. 201080027232 filed May 26, 2010.

Office Action mailed mailed Mar. 4, 2014, in Chinese Patent Application No. 201080027232 filed May 26, 2010.

Office Action mailed May 7, 2014, in Japanese Patent Application No. 2012515372 filed May 26, 2010.

Office Action mailed Oct. 7, 2014, in Japanese Patent Application No. 2012515372 filed May 26, 2010.

\* cited by examiner

METHOD FOR DETERMINING THE LOCATIONS OF ONE OR MORE IMPACTS OR TOUCHES ON A SURFACE OF AN OBJECT INCLUDING TWO OR MORE TRANSDUCERS

The invention relates to a method for determining the locations of one or more impacts or touches on a surface of an object including two or more transducers.

Touch sensitive devices are becoming more and more popular and numerous applications exist. For example, computers can be controlled via touch screens, mobile phones no longer have a numerical keyboard, and the interface of modern vending kiosks also uses this technology.

A part from the capacitive or inductive methods, new technologies based on the analysis of acoustic waves propagating in the object or the interface region, provide attractive technological solutions. Such a method is known from EP 1 512 116. In this method the location of an impact on a surface of an object, e.g. a touch screen or any other input device, is determined by analyzing acoustic signals which are captured by acoustic transducers, like piezoelectric sensors. The measured signal being the result of an impact is then compared with a set of predetermined signals, wherein the predetermined signals correspond to the signals that are sensed when an impacts are generated on a plurality of locations in at least one active zone of the surface of the object forming an acoustic interface and which were established during calibration of the object. When the measured signal and one of the predetermined signals are sufficiently close to each other, it is decided that the location at which the one predetermined signal was obtained during calibration corresponds to the one of the impact. To extract the desired information, the method of EP 1 512 116 normalizes the sensed signals and determines the location of an impact using the phase information of the signal.

Whereas the method functions well in numerous applications, certain limitations have been found in case of low signal to noise ratios or in the presence of more than one impact at a time.

Starting therefrom it is therefore the object of this invention to provide a method and a touch sensitive device that further improves the known method, in particular by providing better results when the signal to noise ratio is rather low.

This object is achieved with the method according to claim 1. This method for determining the locations of one or more impacts or touches on a surface of an object including two or more transducers comprises the steps of: a) receiving a signal, in particular an acoustic signal, from each one of the transducers, wherein the signals correspond to at least one impact at least one location on the surface; b) determining a representative value based on the signals received in step a) and predetermined properties, in particular acoustic properties, of the object at a given location on the surface of the object; and c) deciding whether the at least one impact at the at least one location on the surface of step a) corresponds to the given location on the surface based on a comparison of the representative value and the corresponding value of the at least two signals.

Instead of comparing two signals, the method according to the invention proposes to compute a representative value which not only account for the predetermined acoustic properties but also the properties of the real impact. It appeared that by proceeding this way, it becomes possible to identify the location of an impact on an interaction surface even under less favourable conditions, e.g. for low signal to noise signals and in case more than one impact occurs at the same time.

Here, in this context, the term "impact" relates to any kind of touch event, like a tap with a finger, a stylus, or a continuous interaction on the surface, like a dragging. Furthermore in case of the presence of more than one impact, those especially relate to simultaneous impacts but also to multi drag activities. Furthermore the signals and predetermined properties of the object are preferably in the acoustic range, in particular the audible range. However, according to the invention, the range of frequencies for which signals and properties are obtained can be extended, in particular up to about 100 kHz. The term "properties" or "acoustic properties" relates to values that characterize the object, for instance the acoustic responses that relate the transducers with a given location. These values are typically obtained following a calibration of the system.

Advantageously, the step b) can comprise a step b1) of determining a reconstructed source signal for the given location based on the properties of the object at the given location and the at least two signals received in step a).

In this context, the reconstructed source signal corresponds to an estimation, in particular the best possible estimation, of a source for each one of the locations on the interaction surface for which the acoustic responses for the at least two transducers H1, H2 had been determined beforehand and are thus known and which leads to the signals received by the transducers or at least to signals similar to that. The estimated source thus corresponds to a kind of virtual impact on those locations. Typically, step b1) is carried out in the frequency domain after e.g. a Fourier transformation of the measured signals.

Preferably, step b) can further comprise a step b2) of determining at least two reconstructed signals, in particular acoustic signals, for a given location based on the reconstructed source signal and the properties of the surface of the object at the given location. Thus, the reconstructed source signal serves as the basis of a calculation of the signal one would expect at the transducers when the virtual impact occurs at the given location. The similarity between the reconstructed signal and the measured one provides a possibility to decide whether the real impact occurred at that given location or not.

Advantageously, the comparison in step c) can comprise determining the error energy which can be expressed numerically by $$\sum_k (|e_1(f_k) - e_1'(f_k, i)|^2 + |e_2(f_k) - e_2'(f_k, i)|^2),$$

wherein $e_1(f_k)$ and $e_2(f_k)$ represent the at least two signals received in step a) transformed into the frequency domain, $e_1'(f_k,i)$ and $e_2'(f_k,i)$ represent the at least two reconstructed signals based on the reconstructed source at the given location i on the surface of the object, and the sum goes over the frequencies k of interest, in particular the frequencies for which predetermined properties of the object are present. For the location i closest to the real impact this value will show a minimum. Instead of a second order value, also higher orders, e.g. order 4, of the terms $|e_{1,2}(f_k) - e_{1,2}'(f_k)|$ could be used in the decision taking step c) to even better discriminate between a location at which an impact occurred and other locations.

According to a preferred embodiment, step b) and c) can be combined by directly determining the error energy using the expression $$\sum_k [|e_1(k)|^2 + \lambda_{2,k,i}(|e_2(k)|^2 - |e_1(k)|^2) + \text{Re}(\lambda_{3,k,i} \cdot e_1^*(k) \cdot e_2(k))],$$

wherein $e_1(f_k)$ and $e_2(f_k)$ represent the at least two acoustic signals received in step a) transformed into the frequency domain, $\lambda_{2,k,i}$ and $\lambda_{3,k,i}$ are proportional to the acoustic properties for a given location i on the surface of the object, in particular $\lambda_{2,k,i} = H_1^*(f_k,i)H_1(f_k,i)$ and $\lambda_{3,k,i} = -2 \cdot H_2^*(f_k,i)H_1(f_k,i)$, with $H_1(f_k,i)$ and $H_2(f_k,i)$ representing the acoustic responses between the location i and the position of the transducers. Compared to the above embodiments, less computational power is necessary to determine the location of impact, as the error energy is directly obtained. Thus the process can be realized faster.

Preferably, step b) can comprise a filtering step b3) for removing background noise around the maximum of the reconstructed source signal, in particular, in time domain. By applying a filter the signal to noise ratio for the reconstructed source signal can be further improved. In addition, by applying a filter, it was found out that a plurality of simultaneous impacts can be identified separately, as spurious contributions from distant sources are at least partially removed.

Further preferred step b3) can comprise the steps of: transforming the reconstructed input source signal of step b1) in the time domain; then determining a time ($t_{max}$) at which the reconstructed input signal has a maximum amplitude; then filtering out a time window around $t_{max}$ to obtained a modified reconstructed source signal corresponding to a given impact at the given location on the surface of the object; retransforming the modified reconstructed source signal into frequency domain, and using the modified reconstructed source signal in the frequency domain in step b2) as the reconstructed source signal. With these process steps, the filtering of the signal leads to further improved results.

Advantageously, the steps a) through c) can be repeated for a plurality of locations on the surface of the object. Thus the whole surface of the object can be analyzed to find out at which location the real impact took place. Furthermore, with the inventive method it becomes possible to identify not only one impact but even more than one location of an impact in one analysis run over the locations of the surface of the object for which predetermined properties had been previously determined.

Advantageously, step b) can comprise a triggering step to carry out step b3) only for locations close to the location of a real impact. Triggering could, for instance, be based on an analysis of the phase properties of the reconstructed source signal. With the triggering step the time to identify the location or locations of real impacts can be further reduced.

According to a preferred embodiment, step c) can comprise determining the signal energy of the signals received in step a), in particular by determining the value $$\sum_k (|e_1(f_k)|^2 + |e_2(f_k)|^2),$$

wherein k represents number of values in the frequency domain f, and $e_1(f_k)$ and $e_2(f_k)$ represent the at least two signals received in step a) transformed into the frequency domain and the decision of step c) is taken based on the ratio between the signal energy and the error energy. In this case, the given location which comes closest to the location of the real impact can be identified by a maximum, in particular an absolute or relative maximum.

Preferably, step c) can comprise deciding that the given location corresponds to one location of an impact when the error energy represents an absolute or relative minimum value compared to the error energy of neighbouring locations. In this alternative the given location/s corresponding to a location/s of a real impact can be identified as minimum.

According to the invention, the minimum of the error energy or the maximum of the ratio can be determined after having analysed all locations i of the surface of the object for which predetermined properties have been determined, or can be determined by comparing the value for a given location with the value of a previously analysed location and only keeping the smaller one in case of error energy or the larger one in case of the ratio. The first variant thus provides maps from which more than one extreme can be extracted and thus can be preferably used for multi-impact, multi-touch applications. The second variant is very simple to carry out and thus is of interest when speed plays a major role.

Preferably, both amplitude and phase information of the received signals are used in step b). By not only considering phase information, but also amplitude to determine the representative value, the location of an impact can be determined with even higher precision but also the resistance of the method to any kind of noise.

Further, the invention relates to a computer program product comprising computer executable instructions for performing the method as described above. With this computer program product, the same advantages as with the method can be achieved.

Finally, the invention also relates to the touch sensitive device according to claim 15 and comprising an interaction surface and at least two transducers and a control unit configured to carry out the method according to the method as described above. With this touch sensitive device, the same advantages as with the method can be achieved.

The invention will be described further in detail in relation to the enclosed figures.

Figure 1:
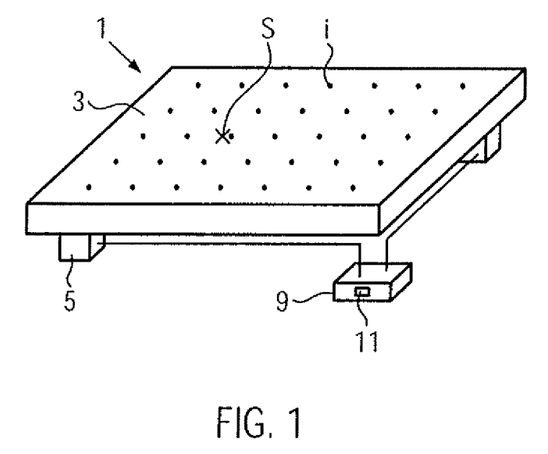
FIG. 1 illustrates a touch sensitive device with an interaction surface configured to carry out the method according to the invention.

FIG. 1 illustrates a three-dimensional schematic view of a touch sensing device 1 using the method for determining a location of an impact on a surface according to the invention.

The touch sensing device 1 comprises an interaction surface 3, via which a user can provide an input to the device by a touch event, and at least two transducers 5 and 7, e.g. piezoelectric transducers, capacitive piezoelectric transducers, magnetostrictive piezoelectric transducers, electromagnetic piezoelectric transducers, or any device capable of transforming an acoustic signal into an electric one. However, the invention can also be carried out with more than two transducers.

The invention will be described for acoustic signals in the audible range, however without departing from the invention, also signals in a frequency range of up to 100 kHz could be analyzed according to the invention.

A control system 9 of the touch sensing device 1 is configured to identify the location of a touch event, an impact by a finger or a stylus, a dragging over the surface, but also a multi touch or multi drag action, during which more than one input are exerted by a user on the interaction surface, to provide this information via an output interface 11 to control inputs to an electronic device (not shown), like a handheld electronic device, a computer or any kind of machine with a touch sensitive interface.

The control system 9 comprises a database with data characterizing the properties in the frequency range of interest, e.g. audible frequencies. For a certain number of locations i, which preferably are spread out evenly over the entire interaction surface 3 or at least a region of interest of the interaction surface, the database comprises values proportional to the acoustic responses $H_1$ and $H_2$ which link the signals S received by the transducers 5 and 7 to the excitation E at the location i by $S = H*E$.

To identify the location s of an impact provided by a user, the control system uses one of the methods as described below.

Figure 2A:
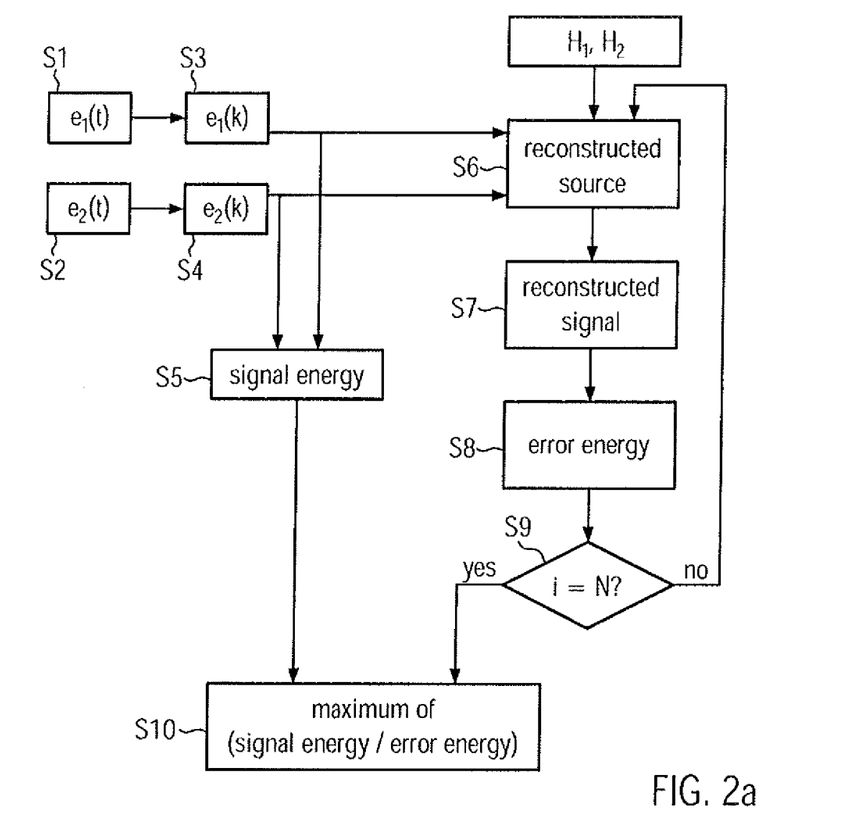
FIG. 2a illustrates a first embodiment of the method to determine the location of an impact according to the invention.

FIG. 2a shows a block diagram of a method according to a first embodiment of the invention. According to step a) of claim 1, the transducers 5 and 7 receive a first and second signal $e_1(t)$ and $e_2(t)$ at steps S1 and S2. Via a Fourier transform (step S3 and S4), in particular a FFT type Fourier transform, the signals are quantized e.g. in 512 values and transformed into the frequency space $e_1(f)$ and $e_2(f)$, here typically the audible frequency range, but the range could also extend beyond, e.g. up till 100 kHz.

Step S5 then consists in determining the signal energy $$\sum_k (|e_1(f_k)|^2 + |e_2(f_k)|^2)$$

where the sum goes over all frequencies or a sub range of these frequencies.

The signals $e_1(f)$ and $e_2(f)$ are furthermore used in step S6 to estimate an input source, thus a virtual source, at a given location i (see FIG. 1) using the properties $H_1$ and $H_2$ of the object stored in the database. $H_1$ and $H_2$ are actually function of frequency f and location i, thus $H_1 = H_1(f,i)$ and $H_2 = H_2(f,i)$. The reconstructed source signal is obtained by the following equation:

$$\widehat{S(f,i)} = \sum_k [\tilde{H}_1^*(f_k,i) \ \tilde{H}_2^*(f_k,i)] \begin{bmatrix} e_1(f_k) \\ e_2(f_k) \end{bmatrix} \cdot \delta(f - f_k)$$

Using $\hat{S}(f,i)$, the reconstructed source signal, one then can obtain the reconstructed signal based on the following equation (S7):

$$\forall f \ \widehat{e_1(f,i)} = H_1(f,i) \cdot \hat{S}(f,i)$$

$$\forall f \ \widehat{e_2(f,i)} = H_2(f,i) \cdot \hat{S}(f,i)$$

These reconstructed signals correspond to the signals observed at transducers 5 and 7 in case an impact corresponding to $\hat{S}(f,i)$ is carried out upon the interface and form the representative values according to step b) of claim 1.

Then in step S8, the error energy of the reconstruction is determined based on the following equation:

$$\text{error energy (at point } i) = \sum_k (|e_1(f_k) - \widetilde{e_1(f_k,i)}|^2 + |e_2(f_k) - \widetilde{e_2(f_k,i)}|^2)$$

Steps S6 to S8 are then repeated (S9) for all locations i=1 to N for which the database has predetermined properties. Instead of a second order value, also higher orders, e.g. order 4, of the terms $|e_{1,2}(f_k) - e_{1,2}'(f_k)|$ could be used in the decision taking step c) to even better discriminate between a location at which an impact occurred and other locations.

Figure 2B:
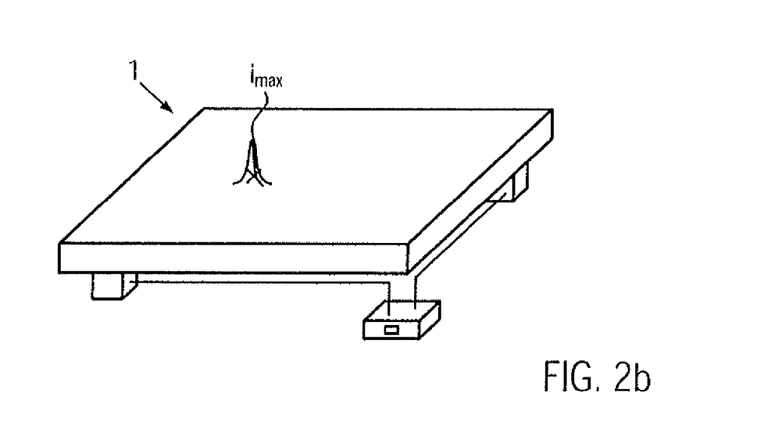
FIG. 2b illustrates the result of the analysis of the first embodiment.

Then the maximum value of the ratio of signal energy of step S5 over error energy of S9 is determined during step S10. The location $i_{Max}$ of the maximum value actually then corresponds to the location where the real impact occurred. This is schematically illustrated in FIG. 2b, which recalls the device of FIG. 1 and also shows the results of the ration signal energy/error energy.

Instead of looking at the maximum of the ratio in S10 it is also possible to carry out the invention by not carrying out step S5 and to search for the minimum error energy value of the error energy values of Step S8. According to a further variant, the location of impact $i_{Max}$ could also be found by memorizing in each iteration the minimum value between the error energy of the location that is currently analyzed and the error energy that was minimal up to then. By doing so the amount of data analysis can be further reduced, as in each iteration only one additional calculation step needs to be carried out.

Figure 3:
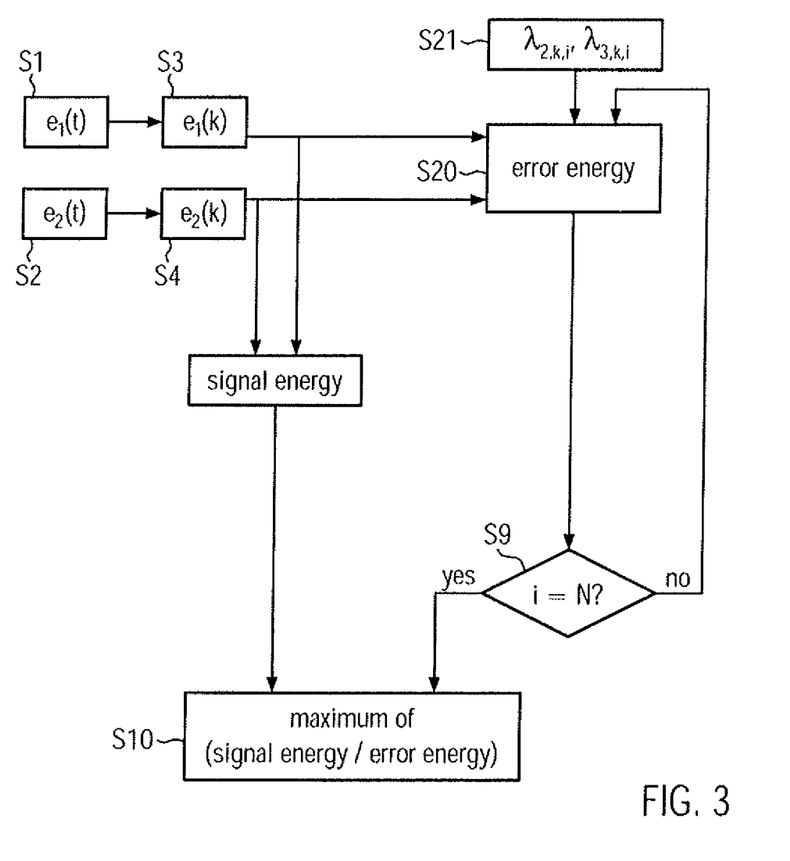
FIG. 3 illustrates a second embodiment of the method to determine the location of an impact according to the invention which can be carried out faster than the first embodiment.

FIG. 3, illustrates a second embodiment of the inventive method. This embodiment represents a simplification of the first embodiment. In fact steps S6 to S8 are combined into one process step by directly calculating the error energy between the measured signals and the reconstructed ones. Steps S6 to S8 are replaced by step S20 which can be expressed as:

$$\text{error energy at position } i = \sum_k^{233} \begin{bmatrix} |e_1(k)|^2 + \\ \lambda_{2,k,i} \cdot (|e_2(k)|^2 - |e_1(k)|^2) + \\ \text{Re}(\lambda_{3,k,i} \cdot e_1^*(k) \cdot e_2(k)) \end{bmatrix}$$

In this expression $\lambda_{2,k,i} = H_1^*(f_k,i) H_1(f_k,i)$, $\lambda_{3,k,i} = H_2^*(f_k,i) H_1(f_k,i)$ are used out of the lookup table of the device 1 (S21). Compared to the first one the elements of the look up table have therefore been adapted by combining the responses $H_1$ and $H_2$. With these amendments it thus becomes possible to obtain the error energy in one step, thus calculation is simplified and the process can be carried out faster. In this example, the sum over the frequencies goes over 233 values representing the frequencies for which the look-up table provides the responses $H_1$ and $H_2$.

The other process steps correspond to the ones of the first embodiment and their description is therefore not repeated again, but incorporated by reference. The method according to the second embodiment can be adjusted using the same variants as in the first embodiment.

Figure 4A:
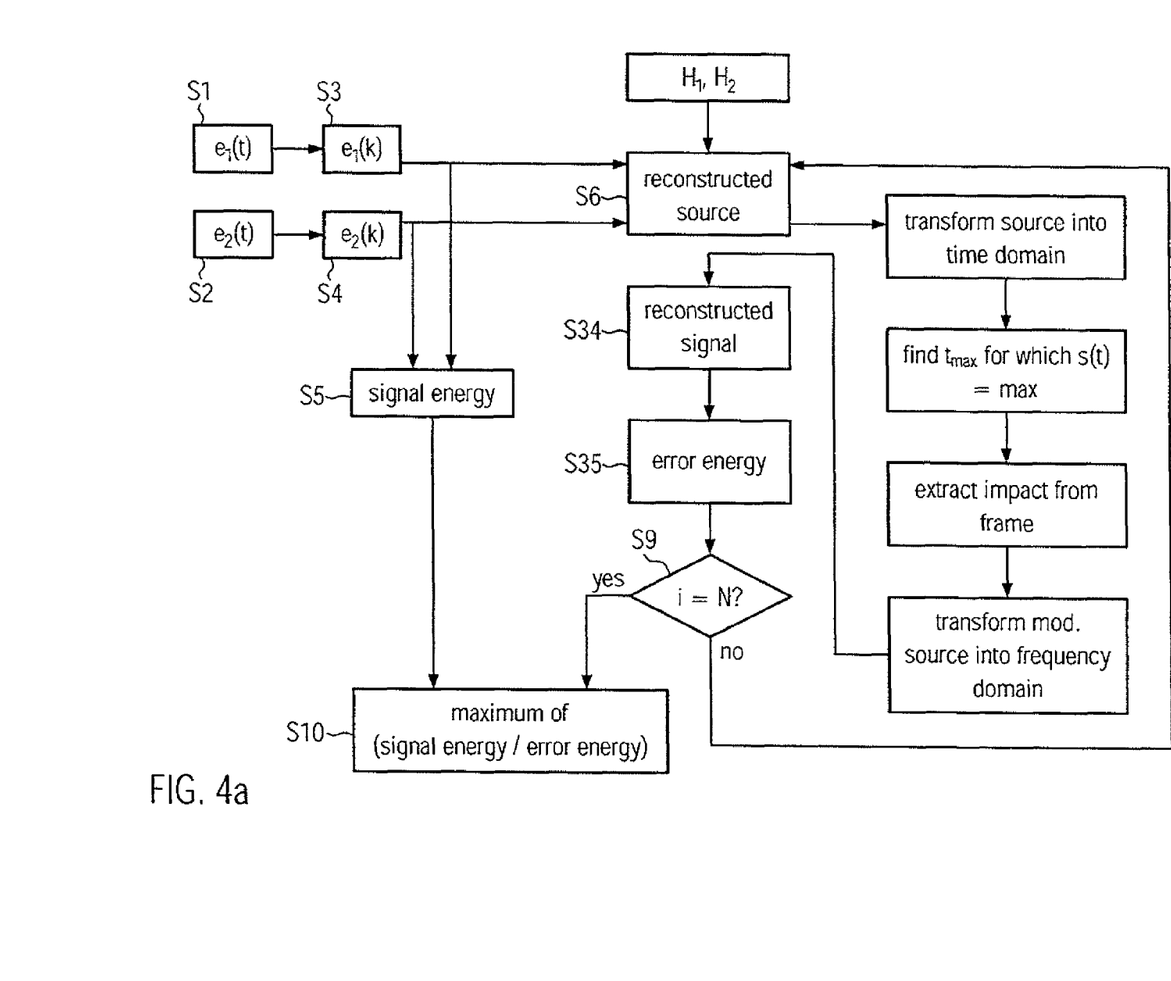
FIG. 4a illustrates a third embodiment of the method to determine the location of an impact according to the invention configured to identify more than one location of impact.

FIG. 4a shows a block diagram of a method according to a third embodiment of the invention. It allows the determination of more than one simultaneous impact on the interaction surface. Here more than one impact, relates to touch events, like taps by fingers, but also to dragging actions over the interface 3 carried out be e.g. two fingers.

Compared to the first embodiment, the third embodiment comprises steps S30 to S35 which replace steps S6 to S8 of the first embodiment. The remaining steps are the same and their description is therefore incorporated herewith by reference.

Figure 4B:
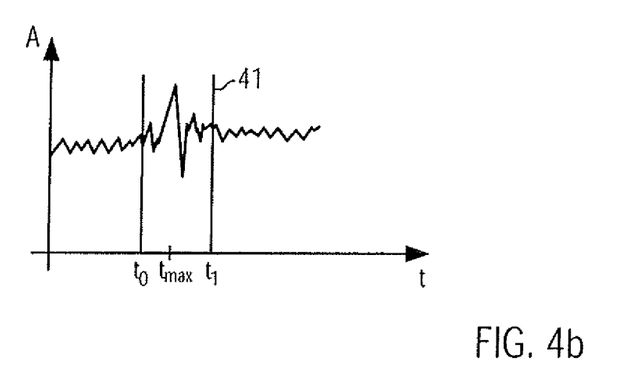
FIG. 4b illustrates the result of the analysis of the third embodiment.

The method of the third embodiment carries out a filtering step on the reconstructed source signal of S6 to remove background noise but also spurious contributions from more distant excitation sources. To do so first of all (S30) the reconstructed source $\hat{S}(f,i)$ is transformed back into the time domain $\hat{S}(t,i)$. The corresponding signal 40 is illustrated in FIG. 4b. In the next step S31, the time $t_{Max}$ for which the signal 40 has its maximum is determined. Then in step S32, only the signal within a window 41 between $t_0$ and $t_1$ positioned around $t_{max}$ is kept, the remaining signal is filtered out. In S33 the modified source signal is again transformed back into the frequency domain $\hat{S}_{touch}(f,i)$ and based on this modified reconstructed source signal the modified reconstructed signal can be determined in step S34 using the expression:

$$\forall f\, e_1(\hat{f},i) = H_1(f,i) \cdot \hat{S}_{touch}(\hat{f},i)$$

$$\forall f\, e_2(\hat{f},i) = H_2(f,i) \cdot \hat{S}_{touch}(\hat{f},i)$$

Based on the modified reconstructed signals again the error energy at the given location i is determined using the expression:

$$\text{error energy (at point } i) = \sum_k (|e_1(f_k) - e_1(\widehat{f_k},i)|^2 + |e_2(f_k) - e_2(\widehat{f_k},i)|^2)$$

Figure 4C:
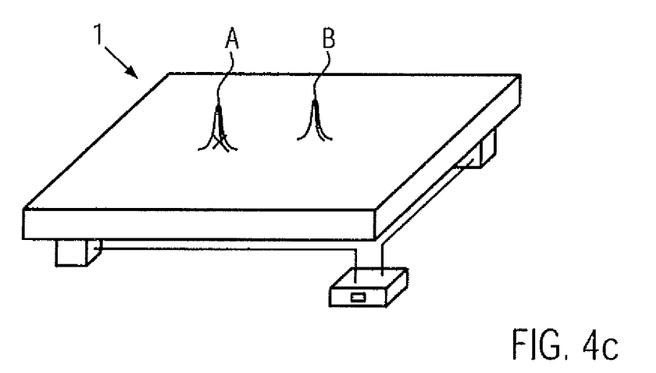
FIG. 4c illustrates the result of the analysis of the third embodiment.

Like in the first and second embodiment, this process is carried out for all locations i on the interaction surface and then based on the maximum ratio criterion, the locations of the impacts are determined by looking at locations with maximum ratios. This is illustrated in FIG. 4c which shows the results of step S10 for a double touch. For positions A and B maximum ratios have been identified using the method according to the third embodiment. This became possible due to the filtering step.

The method according to the third embodiment has the advantage that the two or even more locations can be obtained in one analysis run covering all locations i. For the following frame thus the same process steps can be carried out, so that in real time dragging actions over the surface and multi dragging actions over the surface 3 can also be analyzed.

To further speed up analyzing time, a variant foresees a triggering step, which identifies potential locations at which an impact might have occurred and therefore steps S30 to S35 are only carried out for these locations. For the others the method according to embodiment one or two can be applied.

Of course instead of the maximum ratio criterion, also the other variants as described in embodiment 1 and 2 to identify the location of the impact can be used.

The methods according to the first to third embodiments can be carried out by a computer program product. Furthermore they provide stable results even for low signal to noise ratios as all the information of the received signals, thus amplitude and phase, are used.

The invention claimed is:

1. A method for determining one or more impact locations on an object's surface, the method comprising:
   receiving acoustic signals from at least two transducers, wherein the acoustic signals correspond to at least one impact location on the object's surface;
   determining a representative value based on a reconstructed excitation source signal, wherein the reconstructed excitation source signal is based on an algorithmic transformation of (i) the acoustic signals and (ii) predetermined acoustic properties of the object at a given location on the object's surface;
   removing background noise around a maximum of the reconstructed excitation source signal in a time domain, wherein the removing comprises:
      transforming the reconstructed excitation source signal in the time domain;
      determining a time ($t_{max}$) at which the transformed reconstructed excitation source signal has a maximum amplitude;
      filtering a time window around $t_{max}$ to obtain a modified reconstructed source signal corresponding to a given impact at the given location on the object's surface; and
      transforming the modified reconstructed source signal into a frequency domain; and
   deciding whether the at least one impact location corresponds to the given location on the object's surface based on a comparison of the representative value and a corresponding value of the acoustic signals.

2. The method according to claim 1, wherein the determining the representative value further comprises:
   determining at least two reconstructed acoustic signals for the given location based on the reconstructed excitation source signal and the predetermined acoustic properties of the object at the given location.

3. The method according to claim 2, further comprising: determining an error energy using the expression:

$$\sum_k (|e_1(f_k) - e_1'(f_k,i)|^2 + |e_2(f_k) - e_2'(f_k,i)|^2),$$

wherein $e_1(f_k)$ and $e_2(f_k)$ represent algorithmic transformations of the acoustic signals forming the corresponding values, $e_1'(f_k,i)$ and $e_2'(f_k,i)$ represent the at least two reconstructed acoustic signals based on the reconstructed excitation source signal at a given location i on the object's surface, and the summation is over frequencies of interest, k, comprising frequencies for which the predetermined acoustic properties of the object are present.

4. The method according to claim 1, further comprising: repeating the receiving, determining, and deciding for a plurality of locations on the object's surface.

5. The method according to claim 1, wherein the removing is triggered for locations close to a location of a real impact.

6. The method according to claim 3, further comprising: determining a signal energy of the acoustic signals using the expression:

$$\sum_k (|e_1(f_k)|^2 + |e_2(f_k)|^2),$$

wherein k represents a number of values in a frequency domain, and $e_1(f_k)$ and $e_2(f_k)$ represent algorithmic transformations of the acoustic signals; and
the deciding is based on a ratio between the signal energy and the error energy.

7. The method according to claim 3, further comprising: deciding that the given location corresponds to one location of an impact when the error energy represents a minimum value compared to an error energy of neighboring locations.

8. The method according to claim 6, further comprising determining at least one of:
   a minimum value of the error energy by: analyzing locations i on the object's surface for which predetermined acoustic properties have been determined, or comparing a value for a given location with a value of a previously analyzed location and keeping a smaller value error energy; and
   a maximum value of the ratio by: analyzing locations i on the object's surface for which predetermined acoustic properties have been determined, or comparing a value for a given location with a value of a previously analyzed location and keeping a larger value ratio.

9. The method according claim 1, wherein amplitude and phase information of the acoustic signals are used in the determining the representative value.

10. The method according to claim 1, further comprising: determining at least two modified reconstructed acoustic signals corresponding to the acoustic signals for the given location based on the modified reconstructed source signal and the predetermined acoustic properties of the object at the given location.

11. A non-transitory computer program product comprising one or more non-transitory computer readable media having computer-executable instructions stored therein for execution by a processor to perform operations for determining one or more impact locations on an object's surface comprising:
   receiving acoustic signals from at least two transducers, wherein the acoustic signals correspond to at least one impact location on the object's surface;
   determining a representative value based on a reconstructed excitation source signal, wherein the reconstructed excitation source signal is based on an algorithmic transformation of (i) the acoustic signals and (ii) predetermined acoustic properties of the object at a given location on the object's surface;
   removing background noise around a maximum of the reconstructed excitation source signal in a time domain, wherein the removing comprises:
      transforming the reconstructed excitation source signal in the time domain;
      determining a time ($t_{max}$) at which the transformed reconstructed excitation source signal has a maximum amplitude;
      filtering a time window around $t_{max}$ to obtain a modified reconstructed source signal corresponding to a given impact at the given location on the object's surface; and
      transforming the modified reconstructed source signal into a frequency domain; and
   deciding whether the at least one impact location corresponds to the given location on the object's surface based on a comparison of the representative value and a corresponding value of the acoustic signals.

12. The non-transitory computer program product according to claim 11, further comprising:
   determining at least two reconstructed acoustic signals for the given location based on the reconstructed excitation source signal and the predetermined acoustic properties of the interaction surface at the given location.

13. The non-transitory computer program product according to claim 11, further comprising:
   determining an error energy using the expression:

$$\sum_k (|e_1(f_k) - e'_1(f_k, i)|^2 + |e_2(f_k) - e'_2(f_k, i)|^2),$$

wherein $e_1(f_k)$ and $e_2(f_k)$ represent algorithmic transformations of the acoustic signals forming the corresponding values, $e_1'(f_k,i)$ and $e_2'(f_k,i)$ represent the at least two reconstructed acoustic signals based on the reconstructed excitation source signal at a given location i on the object's surface, and the summation is over frequencies of interest, k, comprising frequencies for which the predetermined acoustic properties of the object are present.

14. The non-transitory computer program product according to claim 13, further comprising:
   determining a signal energy of the acoustic signals using the expression:

$$\sum_k (|e_1(f_k)|^2 + |e_2(f_k)|^2),$$

wherein k represents a number of values in a frequency domain, and $e_1(f_k)$ and $e_2(f_k)$ represent algorithmic transformations of the acoustic signals; and
the deciding is based on a ratio between the signal energy and the error energy.

15. The non-transitory computer program product according to claim 13, further comprising:
   deciding that the given location corresponds to one location of an impact when the error energy represents a minimum value compared to an error energy of neighboring locations.

16. A touch sensitive device comprising:
   an interaction surface;
   at least two transducers coupled to the interaction surface; and
   a control unit coupled to the at least two transducers and configured to:
      receive acoustic signals from at least two transducers, wherein the acoustic signals correspond to at least one impact location on the interaction surface;
      determine a representative value based on a reconstructed excitation source signal, wherein the reconstructed excitation source signal is based on an algorithmic transformation of (i) the acoustic signals and (ii) predetermined acoustic properties of the interaction surface at a given location on the interaction surface;

remove background noise around a maximum of the reconstructed excitation source signal in a time domain, wherein to remove the background noise, the control unit is configured to:
  transform the reconstructed excitation source signal in the time domain;
  determine a time ($t_{max}$) at which the transformed reconstructed excitation source signal has a maximum amplitude;
  filter a time window around $t_{max}$ to obtain a modified reconstructed source signal corresponding to a given impact at the given location on the object's surfaces and
  transform the modified reconstructed source signal into a frequency domain; and
  decide whether the at least one impact location corresponds to the given location on the interaction surface based on a comparison of the representative value and a corresponding value of the acoustic signals.

17. The touch sensitive device according to claim 16, wherein the control unit is further configured to:
  determine at least two reconstructed acoustic signals for the given location based on the reconstructed excitation source signal and the predetermined acoustic properties of the interaction surface at the given location.

18. The touch sensitive device according to claim 17, wherein the control unit is further configured to determine an error energy at the given location on the interaction surface based on the representative value based on the at least two reconstructed acoustic signals, and the corresponding value of the acoustic signals.

19. The touch sensitive device according to claim 18, wherein the control unit is further configured to determine at least one of:
  a minimum value of the error energy at a plurality of locations on the interaction surface; and
  a maximum value of a ratio between a signal energy of the acoustic signals and the error energy at the plurality of locations on the interaction surface.

20. The touch sensitive device according to claim 16, wherein to remove the background noise, the control unit is configured to remove background noise for locations at or near a real impact.

* * * * *

UNITED STATES PATENT AND TRADEMARK OFFICE
CERTIFICATE OF CORRECTION

PATENT NO. : 9,459,732 B2
APPLICATION NO. : 13/379321
DATED : October 4, 2016
INVENTOR(S) : Thuillier et al.

It is certified that error appears in the above-identified patent and that said Letters Patent is hereby corrected as shown below:

In the Claims

Column 11, Line 12, please replace "impact at the given location on the object's surfaces" with --impact at the given location on the object's surface--.

Signed and Sealed this
Twenty-ninth Day of August, 2017

Joseph Matal
*Performing the Functions and Duties of the
Under Secretary of Commerce for Intellectual Property and
Director of the United States Patent and Trademark Office*